United States Patent
Kratochwil (10) Patent No.: US 7,564,868 B2
(45) Date of Patent: Jul. 21, 2009

(54) CONFIGURATION DSL TRANSCEIVER

(75) Inventor: Konrad Kratochwil, Sunnyvale, CA (US)

(73) Assignee: Texas Instruments Incorporated, Dallas, TX (US)

( * ) Notice: Subject to any disclaimer, the term of this patent is extended or adjusted under 35 U.S.C. 154(b) by 936 days.

(21) Appl. No.: 11/116,808

(22) Filed: Apr. 28, 2005

(65) Prior Publication Data

US 2005/0249297 A1    Nov. 10, 2005

Related U.S. Application Data

(60) Provisional application No. 60/568,149, filed on May 4, 2004.

(51) Int. Cl.
*H04J 3/16* (2006.01)
*H04J 3/22* (2006.01)
*H04L 27/00* (2006.01)

(52) U.S. Cl. ...................................... 370/465; 375/295

(58) Field of Classification Search ................ 370/431, 370/465; 375/295
See application file for complete search history.

(56) References Cited

U.S. PATENT DOCUMENTS

| | | | |
|---|---|---|---|
| 5,519,731 | A | 5/1996 | Cioffi |
| 2002/0146014 | A1* | 10/2002 | Karlsson et al. .......... 370/395.6 |
| 2002/0188668 | A1 | 12/2002 | Jeffrey et al. |
| 2003/0223483 | A1 | 12/2003 | Noma et al. |
| 2005/0047497 | A1 | 3/2005 | Rubinstain et al. |

OTHER PUBLICATIONS

"SmartLeap 880 A/VDSL" (Ikanos Communications, 2003).

* cited by examiner

*Primary Examiner*—Kevin C Harper
(74) *Attorney, Agent, or Firm*—Steven A. Shaw; W. James Brady; Frederick J. Telecky, Jr.

(57) ABSTRACT

A DSL modem (21) including a configurable digital transceiver (30) is disclosed. The digital transceiver (30) includes a configuration register (43), or other circuitry, that selects a number of analog transmission ports to be implemented in the modem (21). Instances of analog front-end circuitry (34) for each of the configured ports is also provided. According to the disclosed embodiments, the number of ports supported is scaled with the data rate for each port, and with the signaling bandwidth for each port, to maximize the efficiency of the transmission.

14 Claims, 5 Drawing Sheets

CONFIGURATION DSL TRANSCEIVER

CROSS-REFERENCE TO RELATED APPLICATIONS

This application claims priority, under 35 U.S.C. §119(e), of Provisional Application No. 60/568,149, filed May 4, 2004.

STATEMENT REGARDING FEDERALLY SPONSORED RESEARCH OR DEVELOPMENT

Not applicable.

BACKGROUND OF THE INVENTION

This invention is in the field of high-speed digital data communications, and is more specifically directed to digital subscriber line (DSL) communications using discrete multitone (DMT) modulation.

Digital Subscriber Line (DSL) technology has become one of the primary technologies in the deployment of high-speed Internet access in the United States and around the world. As is well known in the art, DSL communications are carried out, using existing telephone "wire" facilities, between individual subscribers and a central office (CO) location operated by a telephone company or an Internet service provider. Typically, some if not all of the length of the loop between the CO and the customer premises equipment (CPE) is implemented by conventional twisted-pair copper telephone wire. Remarkably, modern DSL technology is able to carry out extremely high data rate communications, even over reasonably long lengths (e.g., on the order of 18,000 feet) of twisted-pair wire, and without interfering with conventional voiceband telephone communications.

Modern DSL communications achieve these high data rates through the use of multicarrier modulation (MCM) techniques, also referred to as discrete multitone modulation (DMT), by way of which the data signals are modulated onto multiple frequencies over a relatively wide frequency band (on the order of 1.1 MHz for conventional ADSL, and up to as high as 30 MHz for VDSL), this band residing well above the telephone voice band, and subdivided into many subchannels. The data symbols modulated onto each subchannel are encoded as points in a complex plane, typically according to a quadrature amplitude modulation (QAM) constellation. The number of bits per symbol for each subchannel (i.e., the "bit loading"), and thus the number of points in its QAM constellation, is determined according to the signal-to-noise ratio (SNR) at the subchannel frequency, which depends on the transmission channel noise and the signal attenuation at that frequency. For example, relatively noise-free and low attenuation subchannels may communicate data in ten-bit to fifteen-bit symbols, represented by a relatively dense QAM constellation with short distances between points in the constellation. On the other hand, noisy channels may be limited to only two or three bits per symbol, allowing a greater distance between adjacent points in the QAM constellation. High data rates are attained by assigning more bits (i.e., a more dense QAM constellation) to subchannels that have low noise levels and low signal attenuation, and loading subchannels with poorer SNRs with a fewer number of bits, or none at all.

Figure 1:
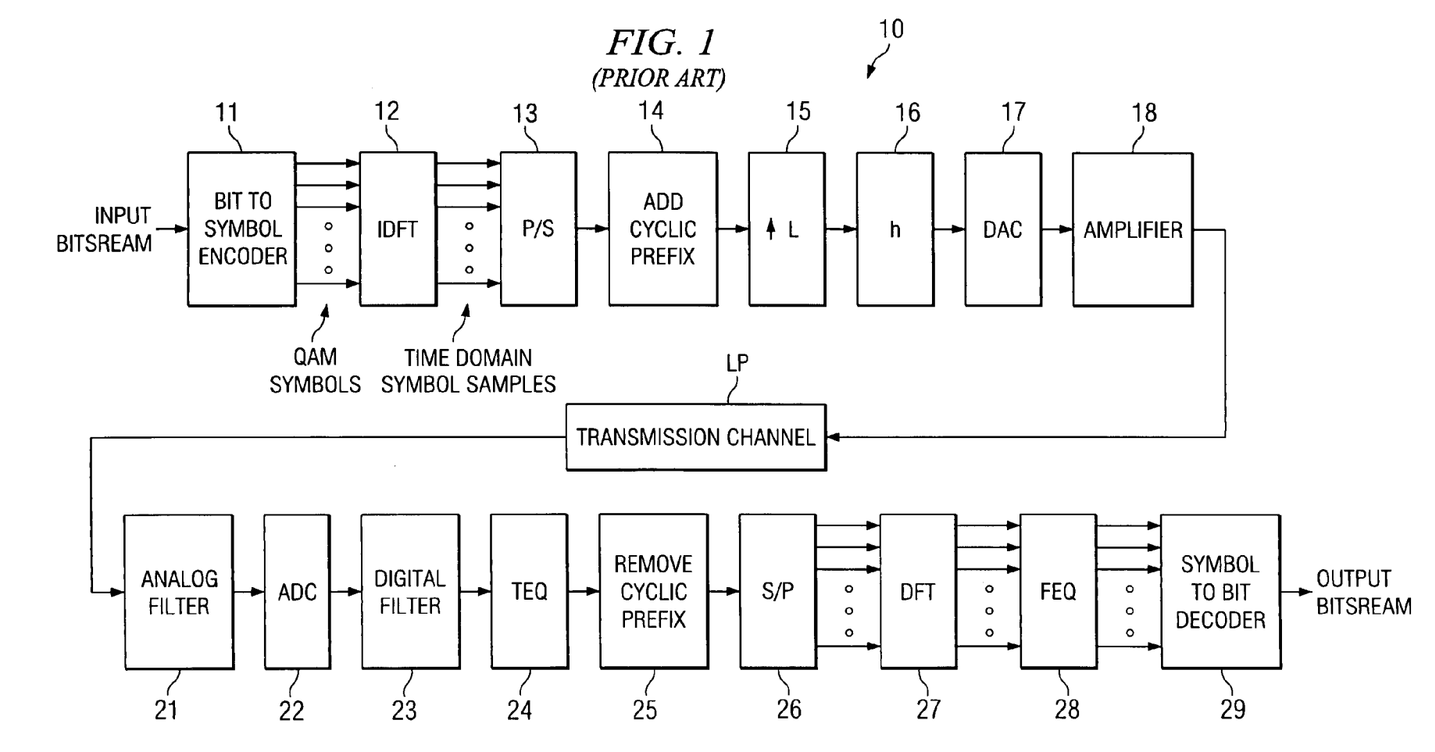
FIG. 1 is a data flow diagram of conventional DSL transmission and receipt over a single DSL link.

FIG. 1 illustrates the data flow in conventional DSL communications, for a given direction (e.g., downstream, from a central office "CO" to customer premises equipment "CPE"). The input bitstream that is to be transmitted, typically a serial stream of binary digits in the format as produced by the data source, is applied to bit-to-symbol encoder 11 in a transmitting modem 10. Encoder 11 groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also apply error correction coding, such as Reed-Solomon coding, for error detection and correction purposes; other types of coding, such as trellis, turbo, or LDPC coding, may also be applied for additional signal-to-noise ratio improvement. The symbols generated by encoder 11 correspond to points in the appropriate modulation constellation (e.g., QAM), with each symbol associated with one of the DMT subchannels.

The encoded symbols are then applied to inverse Discrete Fourier Transform (IDFT) function 12, which associates each symbol with one subchannel in the transmission frequency band, and generates a corresponding number of time domain symbol samples according to the Fourier transform. These time domain symbol samples are then converted into a serial stream of samples by parallel-to-serial converter 13. This serial sequence of symbol values is representative of the sum of a number of modulated subchannel carrier frequencies, with the modulation indicative of the various data values. Typically, N/2 unique complex symbols (and its N/2 conjugate symmetric symbols) in the frequency domain will be transformed by IDFT function 12 into a block of N real-valued time domain samples.

As known in the art, cyclic insertion function 14 adds a cyclic prefix or suffix, or both, to each block of serial samples presented by parallel-to-serial converter 13. In conventional ADSL, cyclic insertion function 14 prepends a selected number of sample values from the end of the block to the beginning of the block. In ADSL2+ and VDSL, cyclic prefix and suffix insertion, and transmitter windowing, are combined into a single module, such as cyclic insertion function 14. Upsampling function 15 and digital filter function 16 then process the digital datastream in the conventional manner. Digital filter 16 may include such operations as a digital low pass filter for removing image components, and digital high pass filtering to eliminate voice band or ISDN interference. The digital functions corresponding to encoder 11 through digital filter function 16 is typically performed by a digital transceiver integrated circuit, which may be implemented as a digital signal processor (DSP) device.

The filtered digital datastream signal is then converted into the analog domain by digital-to-analog converter 17. Analog filtering (not shown) may then be performed on the output analog signal, such filtering typically including at least a low-pass filter. The analog signal is then amplified by amplifier 18. Digital-to-analog converter 17, amplifier 18, and any analog filtering, may be implemented in a so-called "analog front end", including a coder/decoder ("codec"), a line driver and receiver, and a hybrid circuit.

The resulting DMT signal is transmitted over a channel LP, over some length of conventional twisted-pair wires, to a receiving DSL modem 20, which, in general, reverses the processes performed by the transmitting modem to recover the input bitstream as the transmitted communication. A receiver "analog front-end", typically including a corresponding hybrid circuit and line receiver, and analog filtering function 21, removes high frequency noise and aliasing from the received analog signal. Analog equalization of the signal may also be performed to compensate for line attenuation characteristics of transmission channel LP. Analog-to-digital conversion 22 then converts the filtered analog signal into the digital domain, following which conventional digital filtering function 23 is applied to augment the function of the analog filters.

Digital filter function 23 forwards the filtered digital datastream to time domain equalizer (TEQ) 24, which is typically a finite impulse response (FIR) digital filter that effectively shortens the length of the impulse response of the transmission channel LP, including the filtering that is performed prior to receipt by TEQ 14. The cyclic prefix is removed from each received block in function 25, and serial-to-parallel converter 26 converts the datastream into a number of samples (2N) for application to Discrete Fourier Transform (DFT) function 27. The DFT of this datastream will recover the modulating symbols at each of the subchannel frequencies, reversing the IDFT performed by function 12 in transmission, and presenting a frequency domain representation of the transmitted symbols multiplied by the frequency-domain response of the effective transmission channel. Frequency-domain equalization (FEQ) function 28 divides out the frequency-domain response of the effective channel, recovering the modulating symbols. Symbol-to-bit decoder function 29 then resequences the symbols into a serial bitstream, decoding any encoding that was applied in the transmission of the signal, and producing an output bitstream that corresponds to the input bitstream upon which the transmission was based. This output bitstream is then forwarded to the client workstation, or to the central office network, as appropriate for the location.

While the data flow of FIG. 1 shows communications in only one direction, each DSL transceiver (i.e., both at the CO and also in the CPE) includes both a transmitter and a receiver, and as such communicates data in the opposite direction over transmission channel LP, according to a similar DMT process. To avoid interference in this bidirectional communication over the same transmission channel LP, the most popular implementation of DSL has been asymmetric DSL ("ADSL"), which follows a frequency-division duplexing (FDD) approach in that "downstream" communications from the CO to the CPE are in one frequency band of the spectrum, and "upstream" communications from the CPE to the CO are in another, non-overlapping, frequency band. For example, downstream communications in modern ADSL occupies 256 subchannels of 4.3125 kHz bandwidth, while upstream communications use 64 such subchannels at lower frequencies than the downstream band (but still above the voice band). The asymmetry suggested by the acronym "ADSL" refers to the wider and higher-frequency band that is assigned to downstream communications, relative to the narrower, lower-frequency, upstream band. As a result, the ADSL downstream data rate is usually much greater than the upstream data rate. Typical downstream data rates for conventional ADSL communications can reach and exceed 8.0 Mbps, depending upon the loop length and channel transmissions.

Of course, the demand continues for ever-higher data rate DSL technologies. The demand for higher data rats is contemplated to escalate as such high volume services as video-on-demand and other video distribution over DSL links, video telephony, and the like are deployed. Newer DSL technologies provide higher data rates by variations of the DMT scheme of ADSL. A first higher data rate DSL approach is known as "ADSL2+", and extended the signaling bandwidth to 2.2 MHz by doubling the number of downstream subchannels to 512, each having 4.3125 kHz. An example of this approach is described in U.S. Pat. No. 5,519,731, now commonly assigned with this application and incorporated herein by this reference. Further advances in DSL data rates, beyond ADSL2+, have now been developed. These technologies are known as "very high bit-rate DSL" ("VDSL" and "VDSL2" are exemplary classes). According to these technologies, up to as many as 4096 subchannels, covering a signaling bandwidth extending up to 30 MHz, are known.

It is becoming apparent that VDSL2 communication approaches will have different implementations in different regions of the world. For example, VDSL2 in North America and Europe is contemplated to provide data rates of up to 30 to 50 Mbps, by using a 12 MHz signaling bandwidth. In Japan and Korea, however, data rates of up to 200 Mbps are contemplated, using a signaling bandwidth of up to 30 MHz. It is believed that the difference in bandwidth and data rates between these markets results from the difference in loop lengths, with much longer distances (up to 18,000 feet) from the central office or optical network unit (ONU) to the subscriber permitted in North America and Europe. Current draft standards for VDSL2 communications contemplate these optional implementations. The primary differences between these VDSL2 approaches are realized by differences in the number of subchannels carried over a given line, and also by differences in the bandwidth allotted to each subchannel.

BRIEF SUMMARY OF THE INVENTION

It is therefore an object of this invention to provide a single DSL digital transceiver that can be configured to support different combinations of subchannels and subchannel bandwidth.

It is a further object of this invention to provide such a digital transceiver that can support multiple DSL ports.

It is a further object of this invention to provide such a digital transceiver that supports multiple DSL ports in an efficient manner, from the standpoint of memory resources.

It is a further object of this invention to provide such a digital transceiver that supports multiple DSL ports in an efficient manner, from the standpoint of computational complexity.

Other objects and advantages of this invention will be apparent to those of ordinary skill in the art having reference to the following specification together with its drawings.

The present invention may be implemented into an architecture for a DSL digital transceiver that can be configured to support different numbers of ports, each port corresponding to a DSL link. In a first configuration, higher data rate communications involving a larger number of subchannels over fewer ports are supported; in at least one other configuration of the digital transceiver, more ports of a lower data rate and a smaller number of subchannels are supported. The digital transceiver effects these configurations by scaling the data rate for those transceiver functions that scale in complexity with data rate, and by scaling the signaling bandwidth for those transceiver functions that scale in complexity with the signaling bandwidth. Preferably, the bandwidth scaling is accomplished by scaling the number of subchannels, keeping subchannel bandwidth constant, to minimize the required memory resources.

DETAILED DESCRIPTION OF THE INVENTION

The present invention will be described in connection with its preferred embodiment, namely as implemented into a digital transceiver for a digital subscriber line (DSL) modem. However, it is contemplated that this invention may be of benefit in other applications, particularly those that transmit signals according to discrete multitone (DMT) modulation. These other applications may include wireless communications (e.g., according to Orthogonal Frequency Division Multiplexing "OFDM" modulation), other wired communications in wide area network (WAN) and local area network (LAN) implementations over coaxial cable, fiber optic facilities, and the like. Accordingly, it is to be understood that the following description is provided by way of example only, and is not intended to limit the true scope of this invention as claimed.

It has been discovered, in connection with this invention, that the computational complexity of the digital portion of a transceiver used in modern DSL applications, depends on two factors: transmit and receive data rate, and the signaling bandwidth. In the case of discrete multitone (DMT) modulation, the signaling bandwidth translates to the number of DMT subchannels multiplied by the bandwidth of each subchannel (assuming all subchannels to have the same bandwidth, as is typically the case). It has further been discovered, in connection with this invention, that certain data functions in the digital domain scale only with data rate, and certain other data functions scale only with bandwidth. This invention takes advantage of that realization in providing a transceiver that may be configured to have fewer output ports (e.g., as few as one port) for high speed, high bandwidth, communications, or a larger number of output ports for lower speed, lower bandwidth, communications. And computational complexity manifests itself, in the circuitry or hardware sense, as the number of logic gates for a given clock speed, and also as memory requirements. In other words, a higher level of computational complexity for some functions requires a larger number of logic gates, or a higher clock speed, and for other functions requires a larger data memory resource.

Figure 2:
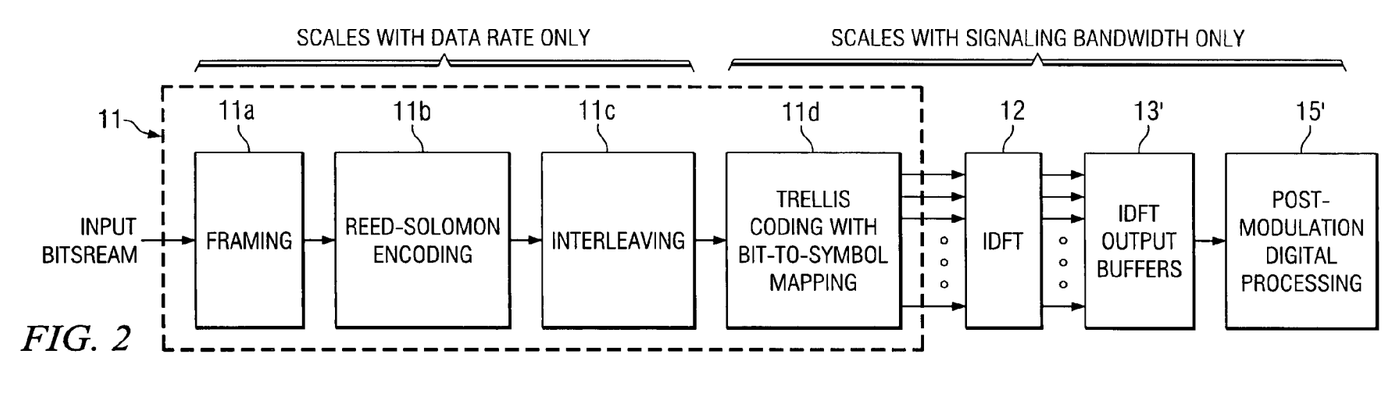
FIG. 2 is a data flow diagram of DSL transmission, indicating the applicability of scaling according to data rate or number of subchannels, according to the preferred embodiment of the invention.

FIG. 2 illustrates this realization, relative to those functions performed in conventional DSL transmission, in the digital domain. Specifically, the functions preparatory to DMT modulation scale only with data rate, while the DMT modulation itself scales with bandwidth. As shown in FIG. 2, the complexity for the framing (i.e., arranging the input bitstream into data frames, as known in the art) 11a, Reed-Solomon encoding 11b (or other forward error correction coding techniques), interleaving 11c, each scale only with the data rate. In other words, the computational complexity of circuitry required to perform pre-modulation functions 11a, 11b, 11c, 11d varies only with data rate; the signaling bandwidth (including the number of DMT subchannels) has no direct effect on the complexity of these functions. In conventional DSL transmission, this dependence is generally linear, such that doubling of the data rate requires approximately twice the computational complexity for these functions. Or, according to this invention, a given DSL transceiver can perform functions 11a, 11b, 11c, 11d for two channels, or "ports", with the same computational complexity as the transceiver can perform these functions 11a, 11b, 11c, 11d for a single "port" of twice the data rate, and vice versa. Framing function 11a, Reed-Solomon encoding function 11b, and interleaving function 11c (together with trellis coding with bit-to-symbol mapping function 11d mentioned below), together correspond to conventional encoding function 11 of FIG. 1. Similarly, on the receive side (not shown for the sake of clarity), the corresponding post-demodulation receive functions of de-interleaving, Reed-Solomon decoding, deframing, also scale in complexity with data rate.

As shown in FIG. 2, trellis coding with bit-to-symbol mapping performed by function 11d, and the DMT modulation performed by IDFT function 12 have been discovered to scale with signaling bandwidth only. In the case of IDFT function 12, it has been found that a 2048-point IDFT requires approximately one-half the computational complexity as a 4096-point IDFT. In other words, IDFT function 12 can modulate signals for two channels or "ports" having 2048 subchannels with approximately the same computational complexity required to modulate signals for a single port having 4096 subchannels, assuming the same bandwidth per subchannel. In fact, it has been observed that modern IDFT processing (for example as performed by modern digital signal processors) can perform the two half-size IDFTs with slightly less computational complexity (i.e., clock cycles, or gates) than is required for the single full-size IDFT.

The functions performed after modulation, including IDFT output buffers 13' and post-modulation digital processing function 15', require a complexity that scales with signaling bandwidth only, and that is substantially independent of data rate. IDFT output buffers 13' are memory locations which can be serially written to from IDFT function 12, and read from in parallel, and as such correspond to serial-to-parallel conversion function 13 of FIG. 1. Post-modulation digital processing function 15' includes such functions as conventional cyclic insertion function 14, upsampling function 15, and digital filter function 16, described above relative to FIG. 1 and well-known in the art.

It has therefore been discovered, in connection with this invention, that the scaling dependencies of these digital transceiver functions can be used to advantage in supporting a configurable number of ports for a given computational complexity. For example, consider a digital transceiver that is capable of supporting 4096 complex carriers (i.e., DMT subchannels) at a tone spacing, or signaling bandwidth, of 8.625 kHz per carrier, resulting in a total signaling bandwidth of 35.3 MHz. According to the preferred embodiment of the invention, this transceiver can be configured to support multiple ports, each with a lower data rate, by scaling the number of carriers, or subchannels, supported by each port:

| Configuration | No. of Ports | Maximum number of subchannels/port | Subchannel Spacing | Maximum signaling BW/port |
|---|---|---|---|---|
| Main | 1 | 4096 | 8.625 kHz | 35.328 MHz |
| A | 2 | 4096 | 4.3125 kHz | 17.664 MHz |
| B | 4 | 2048 | 4.3125 kHz | 8.832 MHz |

-continued

| Configuration | No. of Ports | Maximum number of subchannels/port | Subchannel Spacing | Maximum signaling BW/port |
|---|---|---|---|---|
| C | 8 | 1024 | 4.3125 kHz | 4.416 MHz |
| D | 16 | 512 | 4.3125 kHz | 2.208 MHz |

The "Main" configuration corresponds to the full computational complexity of the transceiver for a single port, which in this case is 4096 complex carriers (i.e., DMT subchannels) at a tone spacing of 8.625 kHz, providing a total signaling bandwidth of 35.328 MHz. According to the preferred embodiment of the invention, the transceiver can be configured in alternate configurations A through D, each of which use a tone spacing of 4.3125 kHz. Configurations A through D divide the overall bandwidth of 35.328 MHz into varying combinations of output ports and complex carriers per port. While the overall signaling bandwidth per port of configuration D, for example, is relatively low, the transceiver can support sixteen such ports at that bandwidth. It is noted that the signaling bandwidth of configuration D corresponds to that of the existing "ADSL2+" standard.

According to an alternate embodiment of the invention, the number of carriers per port can remain constant (e.g., at 4096 carriers per port), but the tone spacing can be scaled to support additional ports. For the example in which the transceiver can support a single port of 4096 carriers at a tone spacing of 8.625 kHz, this transceiver could be scaled to support eight ports, each having 4096 DMT complex carriers, but at a tone spacing of 1.0781 kHz. It has been found, however, that varying the tone spacing rather than the number of carriers requires a substantial increase in memory resources.

Figure 3A:
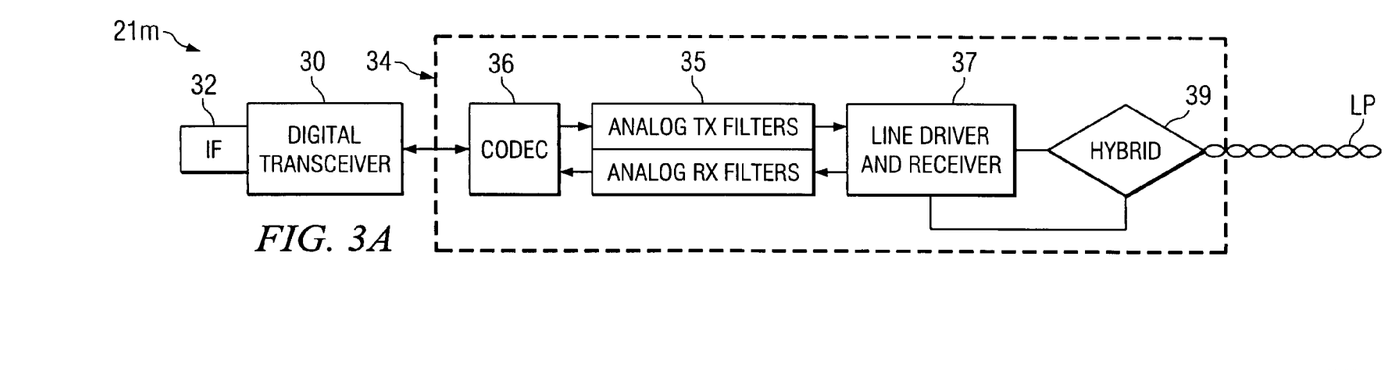
FIGS. 3a and 3b are electrical diagrams, in block form, of alternative implementations of a DSL modem, constructed according to the preferred embodiment of the invention.
Figure 3B:
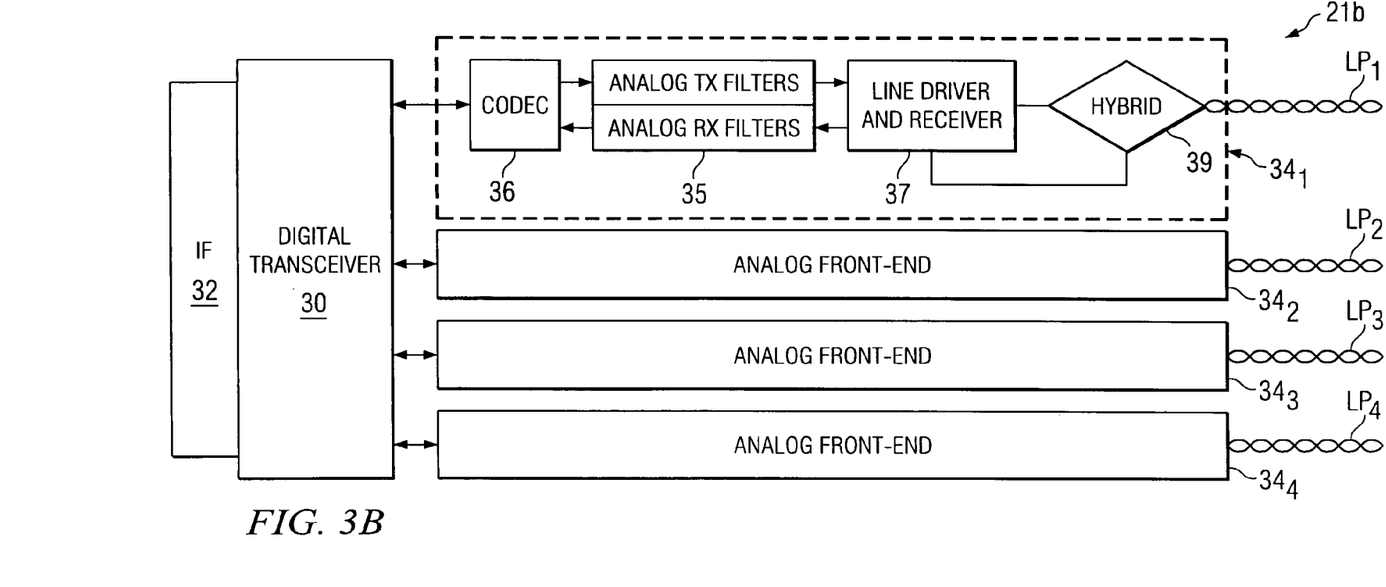

FIGS. 3a and 3b illustrate exemplary DSL modems 21m, 21b, according to the preferred embodiment of the invention. Modems 21m, 21b correspond to the Main configuration and Configuration B of the above table, respectively, considering that modem 21m has a single analog port and modem 21b supports four ports.

Referring first to FIG. 3a, generalized DSL modem 21m for supporting a single analog input/output port is illustrated. DSL modem 21m is effectively a transceiver, in the sense that it can both transmit and receive signals over the communications facility, which in this case is twisted-pair LP. According to this preferred embodiment of the invention, DSL modem 21m includes digital transceiver 30, which is coupled to host interface 32 for communicating with a host computer, network switch fabric, network element such as a router, or the like, depending on the application. According to this embodiment of the invention, as mentioned above, digital transceiver 30 is configurable to support one communications port, such as shown in FIG. 3a, or multiple communications ports (as shown in FIG. 3b). In the example of FIG. 3a, in which digital transceiver 30 supports one port, digital transceiver 30 is connected to a single instance of analog front end 34, which in turn couples to transmission loop LP, shown as twisted-pair wire in this example.

Analog front end 34 includes hybrid circuit 39, which a conventional circuit that is connected to transmission loop LP, and that converts the two-wire arrangement of the twisted-pair facility to dedicated transmit and receive lines connected to line driver and receiver 37, considering that bidirectional signals are communicated over communications loop LP by DSL modem 21m. Line driver and receiver 37 is a high-speed line driver and receiver for driving and receiving ADSL signals over twisted-pair lines. Line driver and receiver 24 is bidirectionally coupled to coder/decoder ("codec") circuit 36 via analog transmit and receive filters 35. Codec 36 in analog front end 34 performs the conventional analog codec operations on the signals being transmitted and received, respectively. Examples of conventional devices suitable for use as analog front end 34 according to the preferred embodiment of the invention include the TNETD7122 and TNETD7123 integrated analog front end devices available from Texas Instruments Incorporated.

Figure 4:
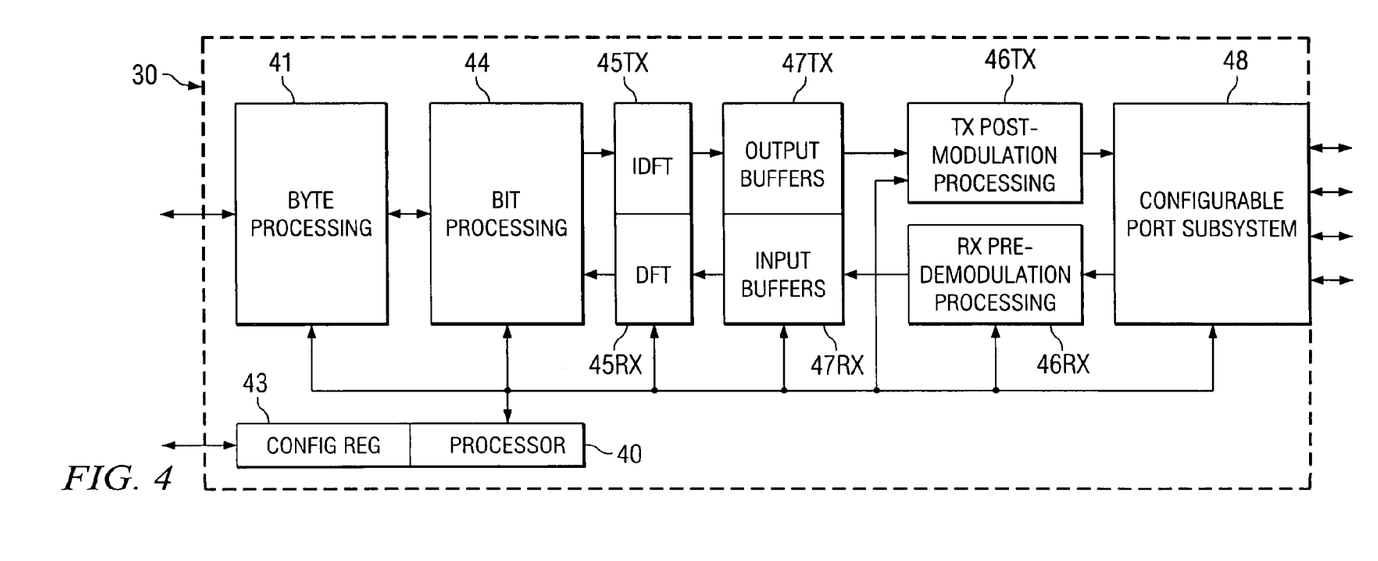
FIG. 4 is an electrical diagram, in block form, of a digital transceiver constructed according to the preferred embodiment of the invention.

FIG. 4 illustrates an exemplary architecture for digital transceiver 30, according to this embodiment of the invention. As shown in FIG. 4, digital transceiver 30 includes byte processing subsystem 41, which is coupled to the host side of transceiver 30, and which performs the byte-level processing of unmodulated digital data (prior to modulation or after demodulation). For example, on the transmit side, byte processing subsystem 41 performs such functions as framing, forward error correction (FEC), and interleaving, such as involved in the TPS-TC and PMS-TC layers as defined in the applicable ADSL/VDSL standards known in the art. Bit processing subsystem 44 performs bit-level operations such as trellis coding and constellation mapping on the byte-processed signals to be transmitted from byte processing subsystem 41, such as involved in the PMD layer as defined in the applicable ADSL/VDSL standards known in the art. Conversely, bit processing subsystem 44 reverses these bit-level processes on received demodulated signals, with the results applied to byte processing subsystem 41 for reversing of the byte-processing operations that were applied in transmission. Transceiver 30 also includes IDFT modulation function 45TX, which modulates the processed signals from bit processing subsystem 44 to be transmitted according to the desired DMT modulation, storing the results in output buffers 47TX; these output buffers 47TX correspond to IDFT output buffers 13' of FIG. 2. Conversely, DFT demodulation function 45RX applies DFT demodulation to received DMT signals that are buffered by input buffers 47RX, according to the desired DMT modulation applied by the transmitter of such signals. According to the preferred embodiment of the invention, subsystems 41, 44, 45TX, 45RX may be realized by customer logic circuitry, or programmable logic such as one or more digital signal processor (DSP) cores, having sufficient computational capacity and complexity to perform much of the digital processing in the encoding and modulation (and demodulation and decoding) of the signals communicated via digital transceiver 30. Transceiver 30 may also include processor 40, which may or may not also be a DSP processor, along with its associated memory resources including both program and data memory, to assist these functions, and to control the configuration of transceiver 30 as will be described below. According to this embodiment of the invention, as shown in FIG. 4, output buffers 47TX are realized as sufficient memory to serve as output buffers for the IDFT modulation of the DMT signals to be transmitted (i.e., IDFT output buffers 13' of FIG. 2). Input buffers 47TX are similarly provided and sized to receive and buffer incoming DMT data.

Digital transceiver 30 also preferably includes other post-modulation functionality 46TX, for performing such functions as appending of a cyclic extension to the output of each IDFT modulation for each port, and applying the appropriate filter functions to the signals to be transmitted. On the receive side, pre-modulation processing functionality 46RX applies the appropriate filter functions to receive signals, and includes such functions as time domain equalization, removal of any cyclic prefix, and the like. Post-modulation processing functionality 46TX and pre-demodulation processing functionality 46RX may be executed by DSP resources within transceiver 30 according to the corresponding software routines, as known in the art, or alternatively may be realized as separate hardware resources as suggested by FIG. 4. On the transmit side, the results of the digital filters applied by post-modulation processing function 46TX may be preferably stored in output buffers 47TX if desired, within the appropriate output buffer 13' space associated with the corresponding port. Configurable port subsystem 48 is also provided within digital transceiver 30, for coupling processing functions 46TX, 46RX to one or more analog output ports within the modem in which digital transceiver 30 is implemented.

According to the preferred embodiment of the invention, digital transceiver 30 also includes processor 40, which implements and effects various control functions within digital transceiver 30. Among other functions, management subsystem 42 operates to configure the functional elements of digital transceiver 30 to support a selected number of one or more analog ports, according to the preferred embodiment of the invention. In this exemplary implementation, the number of ports (and, optionally, other parameters such as the number of carriers per port, and the tone spacing) is determined by a word written into configuration register 43, for example under the control of a user input/output device. In turn, processor 40 issues control signals or the like to configure each of byte processing subsystem 41, bit processing subsystem 44, IDFT modulation function 45TX, DFT demodulation function 45RX, input buffers 47RX, output buffers 47TX, processing functions 46TX, 46RX, and configurable port subsystem 48, effectively to subdivide one (or more) high-data-rate and high-signaling-bandwidth ports into multiple lower-data-rate and lower-signaling-bandwidth ports. In the alternative to configuration register 43, the number of ports may be selected according to other techniques, such as hard-wiring a set of device terminals to a particular voltage or combination of voltage levels, programming a set of fuses (external or internal) with the desired port configuration, or execution of a selected software program. In any event, processor 40 communicates with each of the major functions of digital transceiver 30 to control its operation according to the desired number of ports to be supported. To the extent that the parameters such as number of carriers and tone spacing are not implicit in the number of ports supported, processor 40 also communicates those parameters to the functional blocks of digital transceiver 30 as well. Other control and management functions, including clock generation and control, power distribution and voltage regulation, and the like will also be included within transceiver 30, but are not shown in FIG. 4 for clarity.

It is contemplated that those skilled in the art having reference to this specification will be readily able to realize digital transceiver 30 to provide such functions as configurable port subsystem 48, configuration register 43, and such other circuitry and the corresponding software routines for configuring and operating digital transceiver 30 according to the preferred embodiment of the invention. This description of the functionality of digital transceiver 30 is contemplated to provide sufficient information that such realization of the actual circuitry can be accomplished without undue experimentation.

FIG. 3b illustrates the arrangement of DSL modem 21b, in which digital transceiver 30 supports four communication ports. Host interface 32 and digital transceiver 30 are provided as described above relative to FIG. 3a. However, digital transceiver 30 is configured by configuration register 43 and management subsystem 42 (FIG. 4), or by an alternative approach as mentioned above, so that its configurable port subsystem 48 communicates with four instances of analog front ends $34_1$ through $34_4$, as shown in FIG. 3b. In this case, each of analog front ends $34_1$ through $34_4$ are similarly configured, and each support a DSL link over a corresponding transmission loop $LP_1$ through $LP_4$, respectively.

Accordingly, a single instance of digital transceiver 30 according to the preferred embodiment of the invention is configurable to support a variable number of "ports", or DSL links, depending upon the desired data rate for the links, as well as other parameters such as tone spacing and number of carriers per link. Typical central office (CO) line cards in DSL switching equipment currently support multiple ports, for example from eight to sixty-four ports. As a result, it is contemplated that digital transceiver 30 according to the preferred embodiment of the invention will be most useful in a central office (CO) implementation, and can greatly reduce the number of digital transceiver devices required on a given line card. In addition, the system manufacturer is enabled, by this invention, to carry a single type of digital transceiver device while still able to support the manufacture and implementation of various types of VDSL and other communications protocols and options.

Furthermore, newer DSL technologies are taking advantage of the multiple telephone lines that most residential and enterprise locations already connect to. One example of this technology is so-called "bonded DSL", which uses multiple (two or three, for example) twisted-pair facilities entering the customer premises to carry signals of a single transmission link, thus multiplying the data rate without requiring increases in bandwidth over a single facility. The ability to configure a digital transceiver to support a varying number of ports, according to this invention, is therefore also beneficial in this CPE implementation, specifically by configurably implementing the capability for a bonded DSL modem.

Figure 5A:
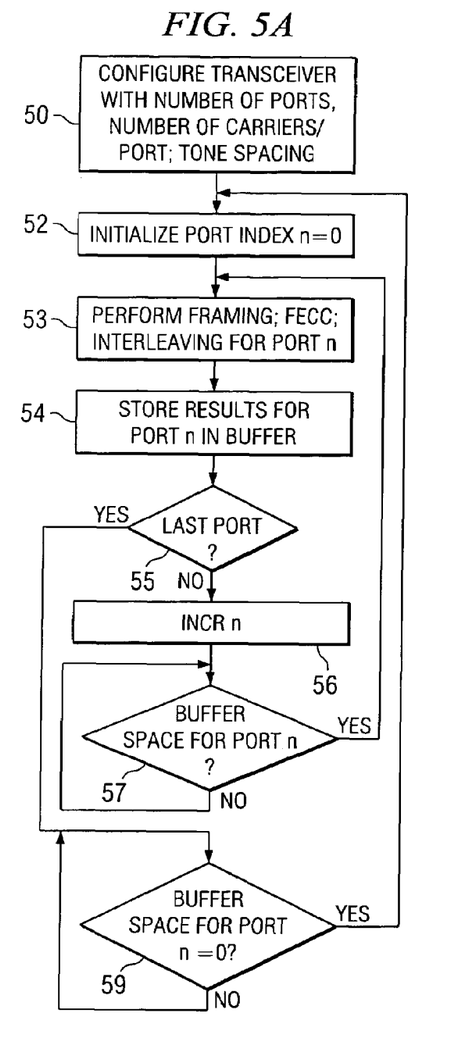
FIGS. 5a and 5b are flow charts illustrating the operation of the digital transceiver according to the preferred embodiment of the invention.
Figure 5B:
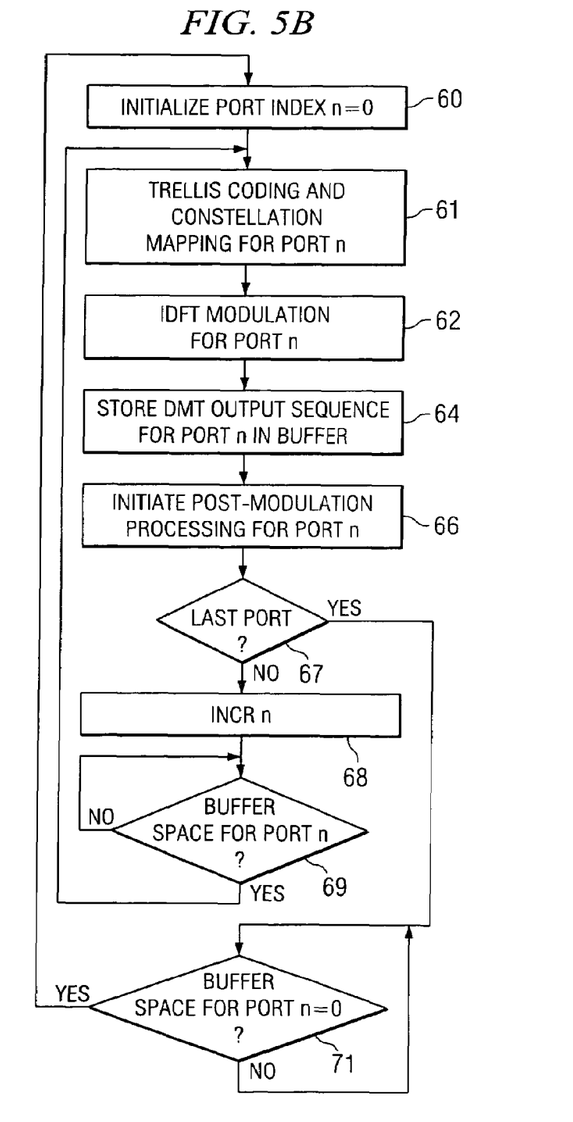

Referring now to FIGS. 5a and 5b, in combination with FIG. 4 and FIGS. 6a and 6b, the transmission operation of digital transceiver 30 according to the preferred embodiment of the invention will now be described. The flow diagrams of FIGS. 5a and 5b are generic to various configurations of digital transceiver 30, specifically relative to the number of ports supported by a single instance of transceiver 30. The timing and buffer capacity plots of FIGS. 6a and 6b correspond to specific exemplary configurations, as will be described in further detail below.

FIG. 5a illustrates the operation of transceiver 30 in performing the pre-modulation functions for the transmission of DMT signals for n ports. As shown in FIG. 2, these pre-modulation functions 11 include framing function 11a, forward error correction (FEC) (e.g., Reed-Solomon coding) function 11b, interleaving function 11c, and trellis coding with bit-to-symbol mapping function 11d, and may include such other pre-modulation functions as appropriate under the desired communications protocol or standard. Similarly, on the receive side (not shown for the sake of clarity), the corresponding post-demodulation receive functions of de-interleaving, Reed-Solomon decoding, deframing, and the like would be included, and would operate in a similar fashion in the reverse direction from the transmission operation, as will now be described.

The transmission operation of digital transceiver 30, according to the preferred embodiment of the invention, begins with process 50, in which transceiver 30 is configured with the number of ports that are to be supported, as well as the DMT parameters for each of the ports. Typically, it is contemplated that each port will carry a similarly modulated signal, with the same number of carriers (or subchannels, or tones) and the same tone spacing (or subchannel bandwidth). As mentioned above relative to FIG. 4, process 50 may be performed by writing of a configuration code to configuration register 43 in digital transceiver 30. Alternatively, the configuration of process 50 may be effected by other conventional approaches, including the programming of fuses or anti-fuses, hardwiring a combination of external terminals to voltages in a pattern corresponding to the desired configuration, and the like, as mentioned above. In response, management subsystem 42 in transceiver 30, according to the example of FIG. 4, configures byte processing subsystem 41, bit processing subsystem 44, IDFT function 45TX, post-modulation processing functionality 46, and configurable port subsystem 48 according to the configuration selected and stored in configuration register 43; similar configuration on the receive side will also be effected. A single port may be configured in process 50, for highest data rate applications, or multiple ports may be configured, each at a slower data rate.

In process 52 of FIG. 5a, digital transceiver 30 next initializes a port index n to an initial value (e.g., zero). Byte processing subsystem 41 then perform the various pre-modulation functions upon a block of data corresponding to the first port n=0, in process 53. As described above, these pre-modulation functions include framing, FEC, interleaving, and the like. Also as mentioned above, the computational complexity of these pre-modulation functions scale with data rate, and not with signaling bandwidth. Accordingly, the number of ports that can be processed by subsystem 41 having a given computational complexity can be doubled if the data rate per port is cut in half. As will be apparent from this description, the reduction of data rate per port in the configuration of digital transceiver 30 to handle more ports is preferably accomplished by reducing the number of data symbols or frames to be transmitted per unit time from each port. This may be accomplished by reducing the number of data bits processed by each instance of process 53 for each configured port.

Following the framing, FEC, interleaving, and other pre-modulation functions executed for port n in process 53, the results are stored for port n in a buffer region, preferably of data memory 44 (FIG. 4), in process 54. Once buffered in process 54, these results for port n are available for trellis coding and constellation mapping by bit processing function 44, and modulation by inverse discrete Fourier transform (IDFT) function 45TX for the example of DMT modulation, as will be described below relative to FIG. 5b. In this embodiment of the invention, processor 40 will empty the buffer for a given port n upon initiating an IDFT modulation for that port, which will of course free up memory space for that port to be reloaded for a next block of data.

Referring back to FIG. 5a, byte processing subsystem 41 determines whether current port n is the last of the multiple ports configured in process 50. If not (decision 55 is NO), port index n is incremented in process 56. Byte processing subsystem 41 then determines, in decision 57, whether sufficient buffer space is present for the next port n (incremented in process 56); if space is present or becomes present after a wait state ("stall") and repeated tests at decision 57 (decision 57 is or becomes YES), pre-modulation operations are then performed on the block of data associated with port n, by way of another instance of process 54. Once the last port has been processed (decision 55 is YES), byte processing subsystem 41 again determines whether buffer space is available for first port n=0 in decision 59; upon space being available (decision 59 is or becomes YES), port index n is again initialized and the pre-modulation processes are performed for all ports, for a next received block of data.

This byte-level pre-modulation processing is performed repeatedly for the multiple configured ports of digital transceiver 30, so long as DMT modulation is also being performed, as will now be described relative to FIG. 5b according to this preferred embodiment of the invention.

In process 60, DSP subsystem 40 initializes port index n (e.g., to an initial value of zero). In process 61, the buffered results from process 54 (FIG. 5a) generated in the byte-level pre-modulation processing for port n are trellis coded and constellation mapped, in the conventional manner. In process 62, an IDFT (or inverse Fast Fourier Transform, IFFT, if desired) is applied to these mapped results, considering each input digital data value as its mapped point in a complex modulation (e.g., Quadrature Amplitude Modulation, or "QAM") constellation associated with one of a set of carrier frequencies. In other words, each symbol is associated with one of a set of carrier frequencies of a discrete multitone (DMT) modulated signal. The output of the IDFT of process 62 is a set of data values that corresponding to a broadband time-domain sequence, containing information at each of the subcarrier frequencies.

As known in the art, the signaling bandwidth for a given DMT signal is largely determined by the number of carriers, or subchannels, in the DMT signal, and by the bandwidth associated with each of those carriers (i.e., the tone spacing). As mentioned above, configuration process 50 determines, either explicitly or implicitly (implicit with the number of ports supported) the number of carriers in the DMT signal and thus the number of "points" in the IDFT of process 62 as executed by DSP subsystem 40, and also the tone spacing (i.e., the carrier frequencies themselves) and similar parameters for the trellis coding and constellation mapping of process 61. As mentioned above, the computational complexity of trellis coding, constellation mapping, and IDFT modulation scales only with the signaling bandwidth, and not with the data rate. Accordingly, if more ports are to be supported by digital transceiver 30, the signaling bandwidth per port is scaled down accordingly, either by scaling the number of carriers per port or by scaling the tone spacing between carriers (or both). It has been discovered, according to this invention, that memory resources are most efficiently conserved by scaling the number of carriers with the number of ports to be supported.

Referring back to FIG. 5b, upon completion of process 62, the time-domain output sequence from process 62, for current port n, is stored in output buffers 47TX, in process 64. Post-modulation processing process 66 is then initiated, such processing including the conventional processes of appending of a cyclic prefix to the IDFT output sequence, digital filtering, and the like, executed by post-modulation processing functionality 46TX as described above, with the results are retained within output buffers 47TX if desired.

Once the IDFT is completed for the current port n, DSP subsystem 40 determines whether data for additional ports remain to be modulated, in decision 67. If so (decision 67 is NO), port index n is incremented in process 68, and decision 69 is performed to determine whether output buffer space for this next port n is available. If space is or becomes available (decision 69 is or becomes YES), trellis coding and constellation mapping process 61 and IDFT modulation process 62 are then performed for this next port. Conversely, if the last of the ports has been processed (decision 67 is YES), upon determining that buffer space is available for the first port (n=0) in decision 71, port index n is reinitialized in process 60 for the next block of data, and the process is repeated.

According to the preferred embodiment of the invention, output buffers 47TX are emptied as the modulated time-domain sequences for the ports are transmitted. The transmission of DMT time-domain sequences in conventional DSL communications is controlled by a fixed symbol rate, determined according to the applicable DSL standard in modern practice. For example, a typical symbol rate for modern DSL communications is 4.3125 kilosymbols per second, corresponding to a tone spacing of 4.3125 kHz. For best efficiency of transmission, of course, it is therefore desirable that the performance of digital transceiver 30 is high enough so that modulated data is available for transmission in each symbol frame. Accordingly, the computational complexity (or capacity) of digital transceiver 30 is preferably high enough so that the IDFT modulation process of FIG. 5b maintains modulated data, ready for post-modulation processing and transmission, in output buffers 47TX at all times. It is contemplated that this requirement is readily met by modern DSP circuits; indeed, it is contemplated that the symbol rate will typically be the limiting factor in the DMT modulation and transmission operations, such that modulation and other processing may periodically be idled to prevent an overflow of output buffers 47TX.

Figure 6A:
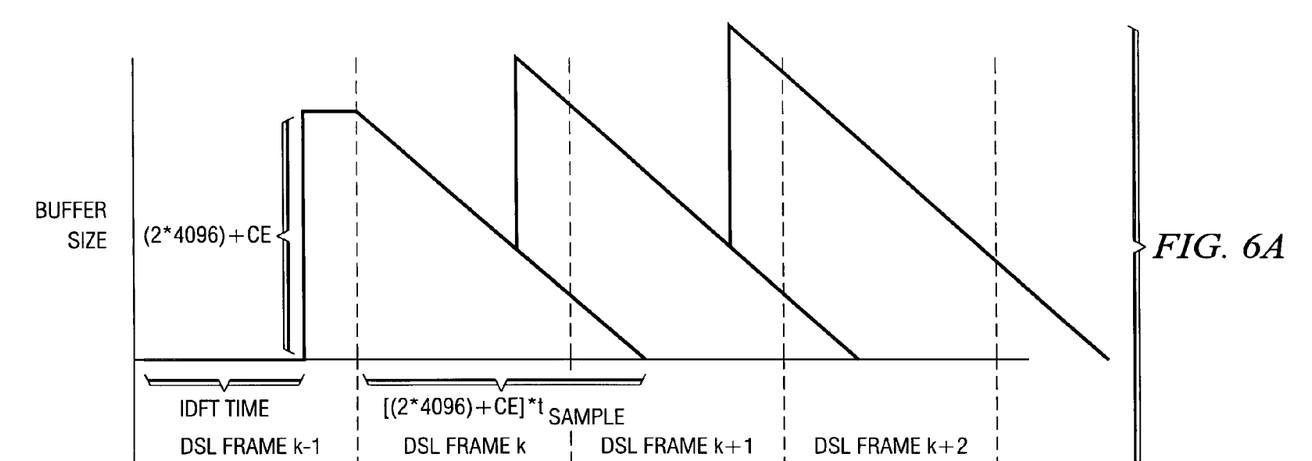
FIGS. 6a and 6b are timing diagrams illustrating the operation of the digital transceiver according to the preferred embodiment of the invention in two exemplary configurations.
Figure 6B:
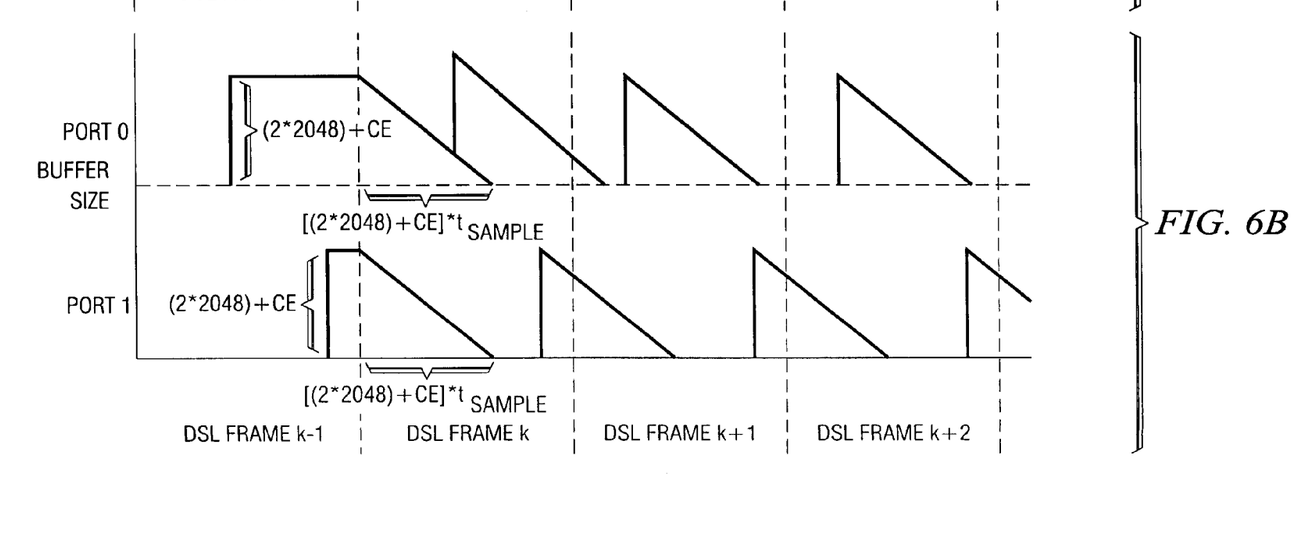

Referring now to FIGS. 6a and 6b, examples of the operation of digital transceiver 30 according to the preferred embodiment of the invention will now be described, with reference to the higher level illustration of FIG. 2. In these Figures, the timing of DSL frames (i.e., time periods over which a full "block" of modulated data is transmitted, and corresponding to time periods equal to the reciprocal of the symbol rate) is shown along the horizontal axis, versus the contents of IDFT output buffers 13' of FIG. 2 (which correspond to output buffers 47TX in the exemplary implementation of FIG. 4) for the configured ports along the vertical axis. As such, the plots of FIGS. 6a and 6b illustrate the transmission timing and also the memory requirements for IDFT output buffers 13' for two configurations. It will, of course, be apparent to those skilled in the art that digital transceiver 30 may be configured according to any number of configurations, depending upon the number of ports desired to be served, the data rates per port, and the availability of memory space.

FIG. 6a illustrates the requirements of IDFT output buffers 13' for a configuration of digital transceiver 30 supporting a single port, at the highest port data rate that it can support. In this example, this single port transmits over 4096 DMT channels, at a tone spacing of 4.3125 kHz. At the beginning of DSL frame k−1, the output buffer 13' for this single port is empty. Upon completion of IDFT modulation process 62 for this single port, output buffer 13' for this single port is loaded with data corresponding to the result of that process, for the signals to be transmitted in the next DSL frame k. In this example, in which the single port transmits over 4096 carriers, output buffer 13' is loaded with two data words for each carrier (corresponding to the complex modulation results), plus data words corresponding to the cyclic extension (CE). The modulation and post-modulation processing to produce these data values, and store them in IDFT output buffer 13', can be accomplished in less time than the time period of a DSL frame, as shown in FIG. 6a. Because DMT transmission is effected in a frame-synchronous manner, however, IDFT output buffer 13' maintains these contents until the beginning of DSL frame k in this example.

At the beginning of DSL frame k as shown in FIG. 6a, the transmission of the contents of IDFT output buffer 13' for this single port begins, at a rate corresponding to the symbol rate. In this example, the time required for the transmission of a data sample is $t_{SAMPLE}$. The time required for transmission of all data values for the contents of IDFT output buffers 13' for frame k is $t_{SYMBOL}=[(2*4096)+CE]t_{SAMPLE}$, which extends beyond the time period for DSL frame k because of the cyclic extension CE. But as shown in FIG. 6a, IDFT output buffer 13' for this single port begins emptying as data is transmitted in DSL frame k.

Before the end of DSL frame k, however, the IDFT modulation and post-modulation processing is completed for the next DSL frame k+1. As such, these results are loaded into IDFT output buffer 13' before it has become completely empty with the transmission of the results for DSL frame k (including cyclic extension CE). The buffer size requirements thus spike upward at this point within DSL frame k, as shown in FIG. 6a. However, the transmission of symbols, and the emptying of IDFT output buffer 13' continues with the transmission of the symbols and cyclic extension for first DSL frame k, and then for the next DSL frame k+1 when frame k is completed, as shown in FIG. 6a. The process then continues in this fashion, with IDFT output buffer 13' for the single port being loaded with new results within each DSL frame.

In addition to illustrating the timing of the modulation and transmission, FIG. 6a illustrates the eventual memory size required for operation of this single port. If the modulation and transmission is continued in the manner illustrated in FIG. 6a, of course an infinitely sized buffer will be required. However, as will be recognized by those skilled in the art having reference to this specification, at some point IDFT output buffer 13' will be sufficiently full that the modulation process can be stalled for a frame, continuing transmission of the DMT signal without underflowing output buffer 13'. In an alternative implementation, the DSL frame processing of the transceiver could be locked to the symbol period $t_{SYMBOL}$, in which case the size of the output buffer 13' would be fixed (rather than growing) from one DSL frame to the next.

FIG. 6b illustrates the modulation and transmission of DMT signals for a different configuration of the same digital transceiver 30, specifically involving support for two DSL ports 0 and 1. Referring back to FIG. 3b, by way of example, two analog front-ends 34 would be implemented in the DSL modem using digital transceiver 30 configured in this manner. In this example, each of ports 0 and 1 transmit a DMT signal using 2048 carriers, and thus at half the signaling bandwidth of the single port illustrated in FIG. 6a. As such, the IDFT modulation process 62 for each of ports 0 and 1 will generate two data values for each of the 2048 carriers, together with a cyclic extension CE. But this modulation process 62 will require only about one-half the computational time and complexity, per port, of that required for the single port example of FIG. 6a in which 4096 carriers are modulated.

As shown in FIG. 6b, therefore, the IDFT modulation results for DSL frame k, after post-modulation processing including adding of the cyclic extension CE and digital filtering, are produced for port 0 within the first half of the time period DSL frame k−1. Because these results are for transmission in DSL frame k, IDFT output buffer 13' for port 0 retains these results for the duration of DSL frame k−1, as shown. IDFT function 12 and post-modulation digital processing function 15' (FIG. 2) then generate the IDFT and post-modulation results for the next port 1 (i.e., in a next pass through the loop of FIG. 5b), and store the results of these processes in output buffer 13' for port 1, also prior to the end of DSL frame k−1.

At the beginning of DSL frame k, both of DSL ports 0 and 1 begin transmitting DMT signals at the corresponding symbol rate, which is the same symbol rate as in FIG. 6a because the tone spacing has remained constant. Prior to the midpoint of DSL frame k, new modulation results for the next frame for port 0 become available, and are stored in the output buffer 13' for port 0; meanwhile, transmission of the previously retained results continues. And prior to the end of DSL frame k, IDFT results are generated for port 1, and are stored in output buffer 13' for port 1, as shown in FIG. 6b.

Accordingly, DSL transmission continues for both ports 0 and 1 in the configuration corresponding to FIG. 6b, with the data rates of each port one-half that of the single port configured according to FIG. 6a. In each case, the same digital transceiver 30 is used, with the configuration for the number of ports to be supported configurable as described above.

In the example of FIGS. 6a and 6b, both the single port of FIG. 6a and the two ports 0 and 1 of FIG. 6b have a tone spacing of 4.3125 kHz. It has been discovered, according to this invention, that scaling the signaling bandwidth by reducing the number of carriers per port while maintaining a constant tone spacing, is preferred in the configuration of the number of ports. This scaling of the number of carriers (Nsc) is preferred because the output buffer memory requirements remain substantially constant over the various configurations. For example, considering the two configurations of FIGS. 6a and 6b, the output buffer memory requirements have been characterized as:

| Number of ports | Tone spacing | Nsc per port | CE per port (samples) | IFFT output buffer size for all ports (samples) | IFFT output buffer size for all ports (2 bytes per sample) |
|---|---|---|---|---|---|
| 1 | 4.3125 kHz | 4096 | 640 | 12800 | 25600 |
| 2 | 4.3125 kHz | 2048 | 320 | 10752 | 21504 |

In fact, as shown in this table, the doubling of the number of ports results in slightly less than that for the single port configuration, because it has been observed that the output buffer size required for two half-size IDFTs is less than that required for one full-size IDFT.

As mentioned above, one may alternatively scale the bandwidth for each port by scaling the tone spacing, rather than the number of carriers per port as scaled in the above example. It has been observed, in connection with this invention, that scaling in this manner requires a much larger output buffer. This is because the number of points generated in the IDFT modulation scales with the number of carriers, but not with the tone spacing. Accordingly, two IDFT processes of the same number of carriers requires on the order of twice the output buffer memory capacity than one IDFT, even if the tone spacing decreases (permitting a slower symbol rate, and thus a scaled data rate).

According to the preferred embodiment of the invention, therefore, a digital transceiver has been provided that is capable of supporting a configurable number of ports. In each case, the full computational complexity of the digital transceiver can be efficiently used, by scaling of the data rates and signaling bandwidth with the number of configured ports. As a result, a single digital transceiver can be manufactured that can be used in a wide range of DSL and VDSL applications, supporting one or a fewer number of high data rate links, or a larger number of links at lower data rates. It is therefore contemplated that the digital transceiver of this invention will be of great benefit in the design and manufacture of digital transceivers, modem equipment (both for the central office and also for customer premises equipment, especially in "bonded" DSL applications), and in the operation of such equipment.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A digital transceiver for multicarrier modulation communications, comprising:
    pre-modulation circuitry for performing pre-modulation processing of digital data;
    digital signal processing circuitry for performing multicarrier modulation of digital data processed by the pre-modulation circuitry;
    configurable port subsystem for subdividing one or more high-data-rate and high-signaling-bandwidth ports into multiple lower-data-rate and lower-signaling-bandwidth ports;
    interface circuitry, for communicating modulated data from the digital signal processing circuitry to one or more of the subdivided ports;
    data memory, coupled to the digital signal processing circuitry, for storing modulated data corresponding to the selected number of ports, wherein the selected number of ports is selected from a set of port configurations including
        a first number of ports, each having a data rate and a signaling bandwidth, and
        a second number of ports, each having a data rate and a signaling bandwidth that is scaled relative to the data rate and signaling bandwidth of each of the first number of ports according to a relationship between the first and second numbers of ports; and
    configuration circuitry, for coupling the pre-modulation circuitry, digital signal processing circuitry, and the interface circuitry, to process transmission data for a selected number of the subdivided ports.

2. The transceiver of claim 1, wherein the pre-modulation processing performed by the pre-modulation circuitry requires computing complexity that scales with data rate per port.

3. The transceiver of claim 2, wherein the pre-modulation processing comprises framing, forward error correction coding, and interleaving.

4. The transceiver of claim 1, wherein the configuration circuitry comprises a configuration register.

5. A method of transmitting a multicarrier modulated signal, comprising:
    configuring a digital transceiver with a selected number of ports, the selected number of ports selected from a set of port configurations including a first number of ports, each having a data rate and a signaling bandwidth, and a second number of ports, each having a data rate and a signaling bandwidth that is scaled relative to the data rate and signaling bandwidth of each of the first number of ports according to a relationship between the first and second numbers of ports;
    for a block of data associated with each of the selected number of ports of a size corresponding to the data rate for the selected number of ports, performing pre-modulation functions;
    then, for each of the selected number of ports, performing inverse discrete Fourier transform modulation for its associated block of data, according to signaling bandwidth parameters corresponding to the signaling bandwidth for the selected number of ports;

forwarding modulated data for each of the selected number of ports to analog front-end circuitry associated with that port;

performing analog processing to the modulated data for each port; and for each port, transmitting multicarrier signals over an associated communications link.

6. The method of claim 5, wherein the step of performing inverse discrete Fourier transform modulation is performed, for each of the selected number of ports, for a number of carriers corresponding to the signaling bandwidth for the selected number of ports.

7. The method of claim 6, wherein the transmitting step is performed in a frame-synchronous manner.

8. The method of claim 5, wherein the configuring step comprises setting a data value in a configuration register.

9. The method of claim 5, further comprising:

after the step of performing inverse discrete Fourier transform modulation, storing modulated data in an output buffer.

10. The method of claim 9, wherein the step of performing inverse discrete Fourier transform modulation is performed, for each of the selected number of ports, for a number of carriers corresponding to the signaling bandwidth for the selected number of ports.

11. A digital subscriber line modem, comprising:

a digital transceiver, comprising:

pre-modulation circuitry for performing pre-modulation processing of digital data;

digital signal processing circuitry for performing multicarrier modulation of digital data processed by the pre-modulation circuitry;

configurable port subsystem for subdividing one or more high-data-rate and high-signaling-bandwidth ports into multiple lower-data-rate and lower-signaling-bandwidth ports;

interface circuitry, for communicating modulated data from the digital signal processing circuitry to one or more the subdivided ports; and configuration circuitry, for coupling the pre-modulation circuitry, digital signal processing circuitry, and the interface circuitry, to process transmission data for a selected number of the subdivided ports;

data memory, coupled to the digital signal processing circuitry, for storing modulated data corresponding to the selected number of ports, wherein the selected number of ports is selected from a set of port configurations including a first number of ports, each having a data rate and a signaling bandwidth, and a second number of ports, each having a data rate and a signaling bandwidth that is scaled relative to the data rate and signaling bandwidth of each of the first number of ports according to a relationship between the first and second numbers of ports; and one or more analog front-end circuits, each connected to one of the ports of the digital transceiver, and connected to a communications facility.

12. The modem of claim 11, wherein the pre-modulation processing performed by the pre-modulation circuitry requires computing complexity that scales with data rate per port.

13. The modem of claim 12, wherein the pre-modulation processing comprises framing and forward error correction coding.

14. The transceiver of claim 11, wherein the configuration circuitry comprises a configuration register.

* * * * *